May 13, 1924.
M. D. RATHBUN
FENDER AND CARRIER DEVICE
Filed Aug. 1, 1922
1,494,325
2 Sheets-Sheet 1
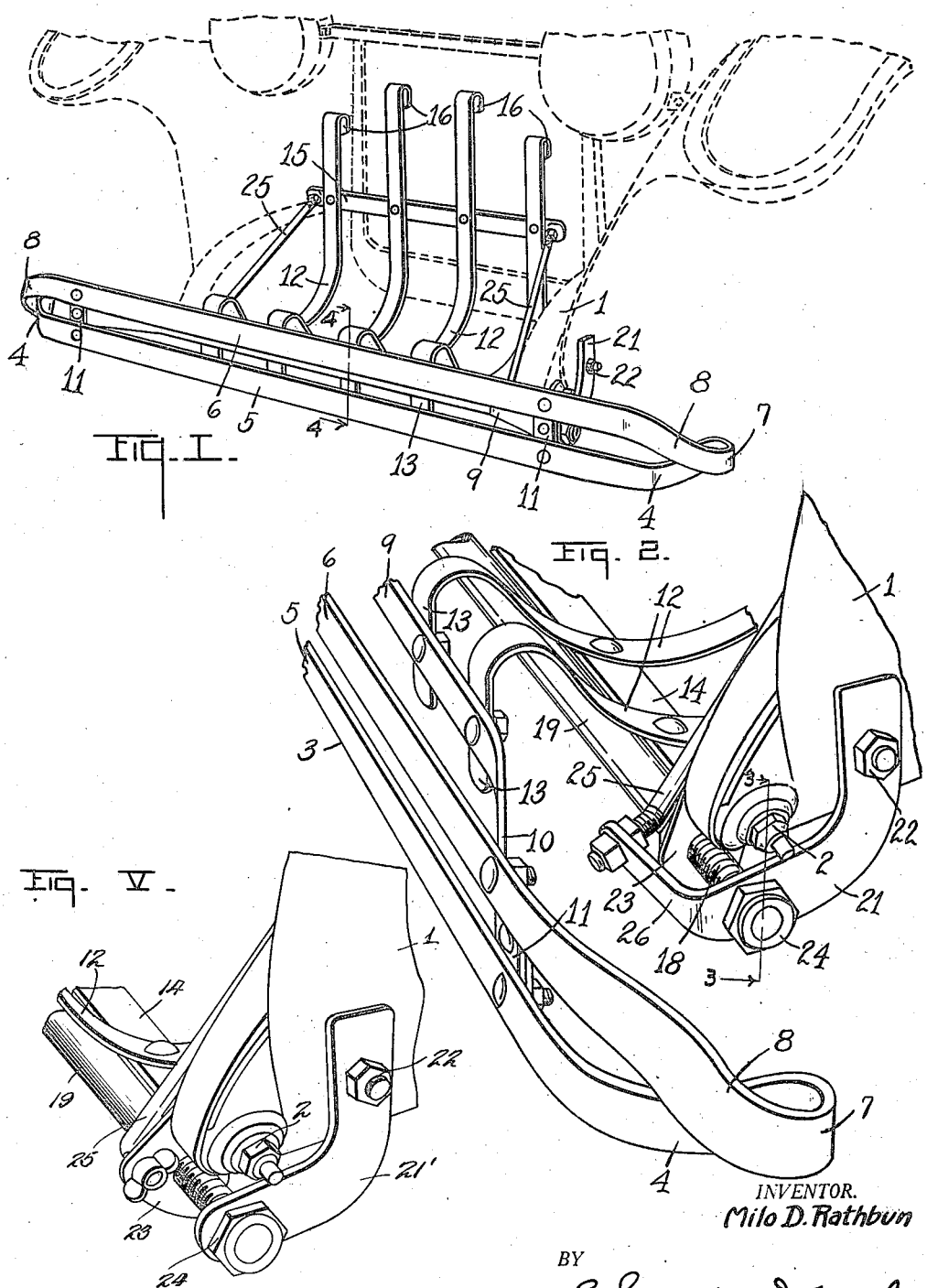
INVENTOR.
Milo D. Rathbun
BY
Chappell & Earl
ATTORNEYS May 13, 1924.
M. D. RATHBUN
FENDER AND CARRIER DEVICE
Filed Aug. 1, 1922     2 Sheets-Sheet 2
1,494,325
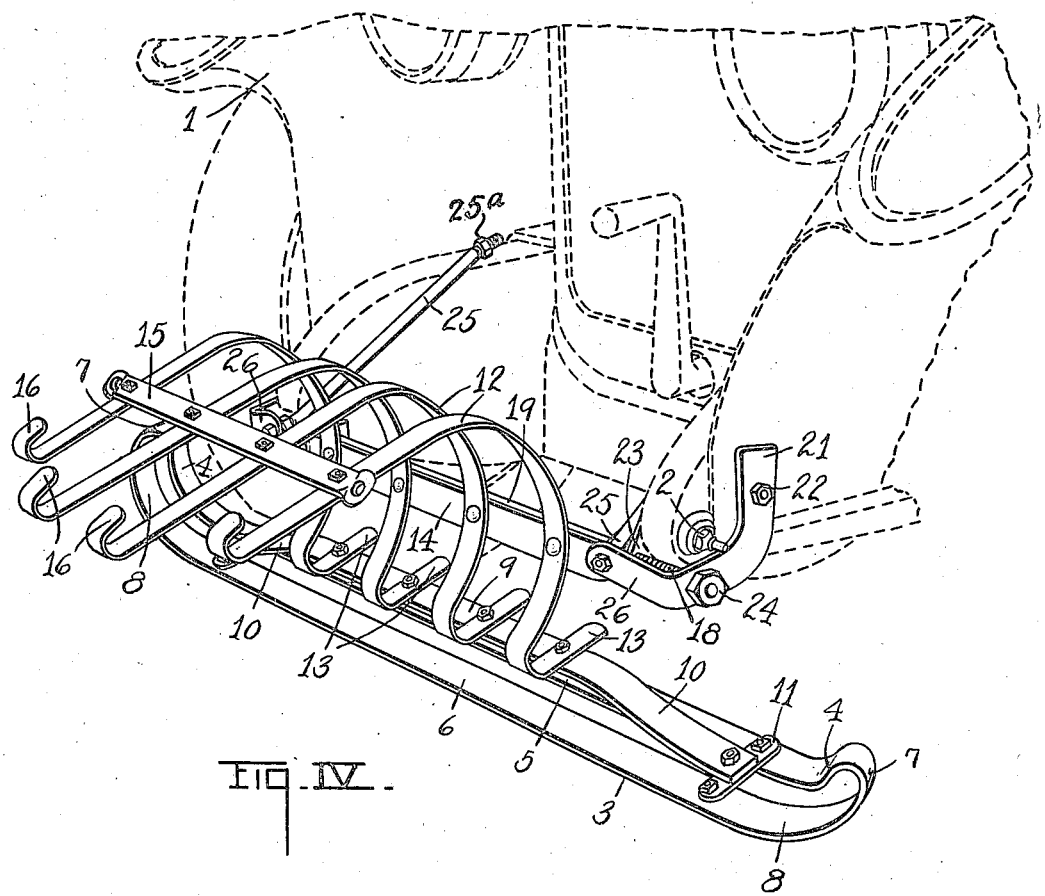
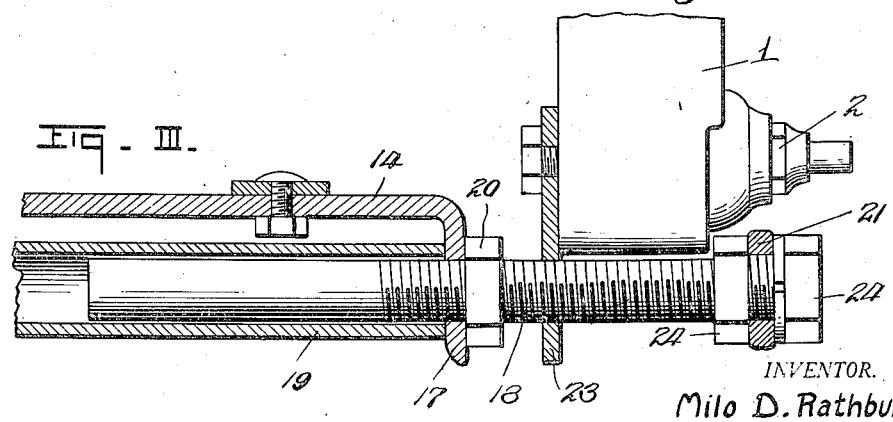
INVENTOR.
Milo D. Rathbun
BY
*Chappell & Earl*
ATTORNEYS Patented May 13, 1924.

1,494,325

UNITED STATES PATENT OFFICE.

MILO D. RATHBUN, OF KALAMAZOO, MICHIGAN, ASSIGNOR OF ONE-HALF TO PAUL E. BEARDSLEY, OF MUSKEGON, MICHIGAN.

FENDER AND CARRIER DEVICE.

Application filed August 1, 1922. Serial No. 578,935.

*To all whom it may concern:*

Be it known that I, MILO D. RATHBUN, a citizen of the United States, residing in the city and county of Kalamazoo, State of Michigan, have invented certain new and useful Improvements in Fenders and Carrier Devices, of which the following is a specification.

This invention relates to improvements in fender devices for automobiles, and has for its object to provide a device of this character that is capable of being affixed to the frontal portion of an automobile or other vehicle, which will act as a fender shield or carrier. My improved fender shield or carrier so operates that the pedestrian who may be accidently struck, is lodged on this fender or shield, instead of being perhaps thrown violently against the front of the car, or of being thrown down or caused to fall under the car.

I am aware that devices of the above character have heretofore been made, and the objects of the present invention are to provide a fender device and carrier which is graceful and attractive in appearance, economical of construction, light in weight and strong and durable, and which is capable of being easily installed on any standard type of automobile. Further objects are to provide improvements in the details of construction and connection, and to have the device sufficiently rugged throughout to support at its frontal portion, any ordinary type of bumper bar, if this latter device may be desired.

The several objects of my invention are accomplished by and the invention is embodied in the new construction, combination and arrangement of parts described in the following specification and shown in the annexed drawings. The invention is defined in the appended claims. Suitable reference characters are applied to the several parts of the device as they appear in the different views in the drawings, in which—

Figure I is a front perspective view of my improved fender, and carrier device; the front end of the vehicle being conventionally shown by dotted lines to illustrate the manner of mounting the invention upon a vehicle.

Figure II is a detail perspective view of my improved fender and carrier device in part, a fragmentary portion of the vehicle being shown, to illustrate the mounting.

Figure III is a detail view partially in vertical section on a line corresponding to line 3—3 in Figure II.

Figure IV is a front perspective view corresponding to that shown in Figure I, the fender and carrier device being shown in its collapsed position to permit the cranking of the automobile, the crank being illustrated in its position by dotted lines.

Figure V is a detail perspective view corresponding to that of Figure II, showing a slight modification in the form of the attaching brackets.

The invention comprises a frame of light open construction and chair like form and having the quality of resiliency, and which frame is adapted to be retained at the front of the radiator and frame members of the car, there being connection details provided so that the device is capable of being disposed and connected at position securely, and which also is capable of being swung from its normal position when cranking of the motor may be necessary.

The fender and carrier frame aforesaid consists of a plurality of metal bars 12 and 12 about one inch wide and three sixteenths of an inch thick arranged in upright position, and retained at spaced distances apart, by rivet connections to the horizontal bars 15 and 9. In each of the projected ends of the bar 15 is provided a hole the function of which will be presently referred to. The cross bar 9 may be of heavier weight than that of the remainder of the bars as it constitutes the extreme front of the carrier frame and may, if desired, comprise extensions and connections for attaching a bumper bar device of the character as shown in the drawings.

The frame bars 12 and 12 are bent to a form somewhat similar to that of a chair, as shown clearly in Figure I, the curve of the body portions being disposed upwardly, and then curved and bent downwardly at their frontal ends. The upper ends 16 of these bars are curved to the rear and downwardly to render the top portions of the frame of smooth construction and neat appearance.

To constitute a practicable support for the said resilient frame, and to render possible the easy and practicable connection of said frame to the car, the details of connection have been provided as follows.

At a suitable location in the lower portions of the frame bars 12 and 12, as shown in Figures III and IV, are secured to a transverse support bar 14 whose ends are turned at a right angle and constitute ears 17 each of which is apertured to permit the passing therethrough of a connecting member. A hollow shaft 19 is of sufficient length to occupy the distance between the said ears 17. Adapted to be secured to the frame members 1 and 1 of the automobile, by bolts 2, are the peculiarly formed brackets shown in the drawing. These brackets are complemental in function and structure; each consists of a metal plate 21 about 2 inches wide and five sixteenths of an inch thick. The body portion is flexed downwardly thence forwardly, the forward portion 26 being thence turned inwardly at substantially a right angle and provided with an aperture in its frontal end, and also an aperture in its main body portion to be occupied by a threaded shaft or bar 18. A clip 23 which is connected to the shackle bolt of the frame member 1, extends downwardly and has an aperture to register at alignment with the aperture in the bracket plate 21.

The bracket shafts 18 and 18 which are of the suitable length shown, are retained loosely in the ends of the hollow shaft 19, and each is provided with a set nut 20. The bracket plates 21 and the support clips 23 having been secured in position, the fender and carrier frame are disposed, as shown, between the car frame members 1 and 1, the threaded bracket shafts 18 and 18 are then shifted outwardly and through the clip plates 23 and 23, and the brackets 21 and 21, on each of the said brackets there being arranged a pair of lock nuts 24. The said lock nuts having been secured, the position of the fender and carrier frame equidistant between the car frame members, may be adjusted, after which the set nuts 23 and 23 are tightened.

By the arrangement and combination of parts as just described it is not only easy to install my improved fender and carrier frame, but the adjusting of same to correct position is quickly accomplished, and there is no possibility of rattle or transverse displacement. At the same time it is possible for the frame to be swung forwardly and downwardly to a position as indicated in Figure IV, so that access may be had to the crank in case of necessity of cranking the motor. To hold the fender frame at the erect or normal position shown, I provide the stay rods 25 and 25. The lower ends of these stay rods may be secured to the arms 26 of the brackets 21, by suitable lock nuts, and the upper ends in their engagement with the ears of the cross bar 15, are fastened by the nuts 25ª. To release the fender frame so that same may be thrown forwardly, the nuts 25ª are removed and the stay rods drawn aside.

My improved safety fender and carrier device, is not only strong and durable, but is resilient and capable of withstanding severe shocks without impairment of same. Besides performing the function of a safety device to protect the lives of persons who might be otherwise injured in case of collision with the car, my invention provides an efficient carrier in which packages and excess parcels may be retained.

The embodiment described and illustrated has been found very satisfactory in carrying my invention into effect; it will be understood however that minor changes and modifications in the structure and details may be made, within the scope of the invention as defined by the appended claims, without departing from the spirit of the invention, or sacrificing any of its advantages.

If it may be desirable to carry a bumper device, the frontal bar 9 may be provided with the extended portions 10. By means of clips 11, there may be supported bumper bar members 5 and 6.

In the modification shown in Figure V, there is illustrated a form of detail wherein the frontal arm 26 of the bracket plate 21 is dispensed with, and the bar 25 is secured directly to the clip plate 23 by a suitable wing nut bolt. By this arrangement these bars 25 may be easily detached from their secured positions.

What I claim as my invention, and desire to secure by Letters Patent, is—

1. A device of the kind described, comprising a resilient frame of light construction and chair like form, a support bar for the frame and having a downwardly disposed apertured ear at each end, a transverse hollow shaft disposed between the said ears, threaded shaft bars retained loosely in the ends of the hollow shaft, a set nut on each of the shaft bars, a bracket plate having an apertured forwardly extending arm, and having an aperture in its body portion through which the threaded shaft bar is adapted to be passed, lock nuts for the said threaded shaft bars, means to secure the bracket plate to the car frame member, and stay members arranged between the forward arms of the brackets and the body portion of the resilient frame.

2. A device of the kind described, comprising a resilient frame of vehicle fender type, a cross bar support element forming part of the frame, loose connections carried by said cross support element and adjustable longitudinally thereof, brackets adapted to be secured to the car frame members, means to secure said loose connections to said brackets, and means to secure the loose connections at adjusted positions on to said cross support element.

3. A fender device for vehicles, comprising a plurality of vertically disposed U shaped resilient frame bars having the ends of their front arms directed downwardly, a frontal cross bar to which the ends of said frame bars are secured, upper and lower cross bars secured to said vertical frame bars the lower cross bar being provided with laterally projecting ears, a support bar comprising a tubular section disposed between the said ears, threaded shaft bars telescoping into said tubular section, support brackets adapted for attachment to the vehicle frame, clips adapted for engagement with the spring shackle bolts, the said brackets and clips being adapted to retain the end portions of said threaded shafts, clamping nuts for the said shafts, and stay rods between the said brackets and the ends of the upper cross bar of the fender frame, said stay rod being disengageable to permit the swinging of the fender frame from its normal erect position.

4. A fender device, comprising a plurality of vertically disposed U shaped resilient frame bars having the ends of their front arms directed downwardly, cross pieces or bars to retain the vertical bars at spaced distances apart, a cross bar secured to said frame bars and provided with laterally projecting ears at its ends, a support bar comprising a tubular intermediate section disposed between the ears of the support bar and threaded end sections telescoping said intermediate section, support brackets adapted for attachment to the vehicle frame, said threaded end portions of the support bar being arranged through said brackets and provided with clamping nuts.

In witness whereof, I have hereunto set my hand and seal.

MILO D. RATHBUN. [L. s.]